United States Patent [19]
DeWitt et al.

[11] Patent Number: 4,946,102
[45] Date of Patent: Aug. 7, 1990

[54] SPRAYING APPARATUS

[76] Inventors: Carl DeWitt, 318 E. Poplar St., Cobden, Ill. 62920; Gerald A. Fink, RR 2, Box 120, Murphysboro, Ill. 62966

[21] Appl. No.: 374,873

[22] Filed: Jul. 3, 1989

[51] Int. Cl.⁵ .................................................. B05B 1/20
[52] U.S. Cl. .................................. 239/167; 239/600
[58] Field of Search ............... 239/159, 164, 166–168, 239/172, 176, 600

[56] References Cited

U.S. PATENT DOCUMENTS

| | | | |
|---|---|---|---|
| 2,995,307 | 8/1961 | McMahon | 239/167 X |
| 3,902,667 | 9/1975 | Jackson | 239/167 |
| 4,213,565 | 7/1980 | Jackson | 239/167 X |
| 4,288,034 | 9/1981 | Widmer et al. | 239/159 X |
| 4,643,358 | 2/1987 | Jackson | 239/166 |
| 4,784,324 | 11/1988 | DeWitt et al. | 239/165 |
| 4,878,616 | 11/1989 | Richardson | 239/167 |

Primary Examiner—Andres Kashnikow
Assistant Examiner—William Grant
Attorney, Agent, or Firm—Kalish & Gilster

[57] ABSTRACT

Vehicular apparatus for spraying herbicides and insecticides has a supporting frame for being carried by a truck or trailer. Upright supports are carried by the frame and trailing boom supports extend rearwardly from the upright supports, which carry structure for selective pivoting of the trailing boom supports relative to the upright supports to permit vertical adjustability of the spray. Lateral booms are supported by the trailing boom supports and connected to them such that the lateral booms can pivot relative to the trailing boom supports and ground. The lateral booms include a supporting base section, a mid-section, and a boom tip section. At least the tip section of the lateral boom includes spray nozzles for selective liquid spraying. A pivotal connector connects and provides forward and backward horizontal pivotal movement of the boom mid-sections relative to the boom base sections. Another pivotal connector connects and provides vertical pivotal movement of the boom tip sections relative to the boom mid-sections. The pivotal connectors provide selective horizontal and vertical lateral boom section positioning as well as approximation by the boom sections of terrain contour to be sprayed.

18 Claims, 6 Drawing Sheets

SPRAYING APPARATUS

BACKGROUND AND SUMMARY OF THE INVENTION

The invention relates to herbicidal and insecticidal spray application and, more particularly, to a trailer or truck mounted sprayer for performing multiple spraying applications.

Numerous problems exist for farmers in the tasks of pest and weed control. Farmers must broadcast herbicides and insecticides at a uniform rate over entire fields for acceptable results. During spraying, the uneven terrain of some fields should be closely contoured to insure correct rates of chemical are applied. Spraying too high above the ground causes the spray pattern to overlap, causing some areas to receive too much chemical, which may "burn" the crops, while others receive too little, allowing weed or insect survival. Carrying the boom too close to the surface being sprayed prevents the full spray target pattern from being realized and results in gaps in coverage where undesirable vegetation or insects may thrive.

Herbicides and insecticides seldom work perfectly. Once crops have emerged, weeds and brush also emerge in some scattered locations or over the entire field. Mechanical cultivation cannot eradicate weeds growing directly in the rows without also destroying the crop. Surviving weeds may be of varying heights and often outgrow the crops, shading them and robbing nutrients from the soil, resulting in lowered crop yields. The current practice is to hand remove these surviving weeds or to manually spot spray with herbicides, both slow and expensive procedures. Alternatively, large areas may be sprayed from a fixed boom height, wasting chemicals and resulting in uneven coverage, as previously described, because of the wide range of weed heights. Also, many fences and ditches are infested with brush which can only be removed by mowing, hand cutting or hand spraying, all uneven and slow processes at best.

Accordingly, it is among the several objects of this invention to provide fully automated accurate broadcast spray capability, automated spot spraying of weed infested fields, simplicity of design and ultimately of maintenance, and a means of spraying fencelines and ditches all without the operator having to leave his seat.

In furtherance of the objects of the invention, it is intended that the invention be trailer mounted, tractor towed and powered, or alternatively, self-propelled and completely self-contained. A tractor drives a hydraulic pump which in turn powers a conventional spray pump and energizes the hydraulic cylinders used for all boom movements. The tractor's electrical system is used to activate all hydraulic and spray valves. Spray nozzles, spray lines, valves and storage tanks may all be commercial models commonly in use.

A further object of the invention is that the sprayer utilize a dual boom arrangement, each boom connected by a boom pin at one end and supported on an air or steel spring at a point along its length. Each boom is hinged between its base section and its mid-section to allow horizontal movement. This permits folding alongside the apparatus for transport or to yield if the boom strikes an immovable object, thereby preserving the integrity of the boom. The boom tip section selectively tilts or rotates vertically to allow folding over the midsection for transport or below horizontal to permit the boom to contour the terrain being sprayed. A vertical hydraulic pressure-relief valve (or break-away) is used to prevent damage to the boom if the tip comes in contact with the ground or some other fixed object, by allowing the tip to tilt away from the object. An air or steel spring suspension system absorbs shock without transmitting it to the boom.

Another object of the invention is that the twin lateral booms can move independently of each other to permit more accurate contouring of the terrain. Tip sections are optionally used in a vertical position for spraying fences or treelines and various spray widths can be obtained by folding one or more boom sections out of the way.

Both lateral booms are raised or lowered simultaneously by means of pairs of tiltable support arms mounted on the sprayer frame. Parallelogram linkage of the support arms to the lateral spray booms and to the upright support means maintains a vertical spray pattern throughout the full range of height adjustments. All boom movements, including raising the trailing support arms, are intended to use hydraulic power and can be made while the sprayer is in use, without stopping the machine and without the operator leaving his seat.

It is intended that in the broadcast mode the apparatus may spray a width of over 60 feet. Spray height may be adjusted from near ground level to nine feet above the ground. Even greater heights are optionally available for special applications. Sections of the two booms may move vertically or horizontally, as previously described, but independently of movements of the other boom. Each boom rides on an air or steel spring cushion to absorb shocks when the trailer wheels pass through ditches or over uneven terrain. When the boom strikes immovable objects it breaks away hydraulically to prevent damage to the boom. The operator then returns the boom to the spraying position by activating the boom hydraulic system. There is no need for dismounting or stopping to store the boom for transport, to contour the boom to fit the terrain or to change the boom height.

A further object of the present invention is that spot or broadcast spraying over very large weeds, brush, and even trees is possible. In furtherance of this object, the two booms can be raised or lowered to apply contact herbicides for eliminating undesirable vegetation from growing crops. Individual spray nozzles can be activated to spray only a single site or multiple nozzles can be activated for various width broadcast patterns. The ability to quickly raise or lower the booms while in motion enables the operator to place the spray nozzles the correct distance from the plants to be sprayed. Previously, uneven weed heights were a problem because of the need to mechanically raise the boom. The availability of rapid hydraulic changes gives increased crop production by increasing spraying accuracy.

Unlike existing sprayers, the present invention is comprised of two booms each secured by a pin at one end and suspended over an air or steel spring shock absorber, providing a more stable spray platform. Furthermore, the range of spraying heights is greater than present sprayers and can be hydraulically adjusted while the apparatus is in motion. A unique parallel arm system maintains a vertical spray pattern throughout spray boom height adjustment. The sprayer can be folded for transport or unfolded for field use without time-consuming operator dismount. Also, the boom is vertically adjustable to contour uneven ground and various spray widths are possible, from spot to full width, by merely automatically activating various patterns of spray nozzles and folding boom sections. Thus, the sprayer provides added versatility for spraying fences, ditches, etc. Additionally, more efficient use of chemicals is possible with better spray control, more effectively killing weeds or pests and permitting increased crop production. Finally, by having an all-encompassing control console at the tractor, the operator is able to simultaneously control all spray functions and boom movements without dismounting.

Briefly, a vehicular apparatus for spraying herbicides and insecticides comprises the present invention. The apparatus has a supporting frame for being carried by a truck or trailer. Upright supports are carried by the frame and trailing boom supports extend rearwardly from the upright supports. The upright supports carry means for providing selective pivoting of the trailing boom supports relative to the upright supports, for providing vertical adjustability of the spray. Lateral booms are supported by the trailing boom supports and connected to them by means which allow selective pivoting of the lateral boom means relative to the trailing support means as well as to the ground. The lateral booms include a supporting base section, a mid-section, and a boom tip section. At least the tip section, but more preferably, all of the sections, of the lateral boom include spray nozzles for selective spraying of liquids. A pivotal connector connects and provides forward and backward horizontal pivotal movement of the boom mid-sections relative to the boom base sections. Another pivotal connector connects and provides vertical pivotal movement of the boom tip sections relative to the boom mid-sections. The pivotal connectors provide selective horizontal and vertical lateral boom section positioning as well as approximation by the boom sections of terrain contour to be sprayed Hydraulic cylinders permit the lateral boom mid and tip sections to be operationally maintained at preselected positions. A conventional hydraulic pressure relief mechanism permits release of the pressure and the geometry of the apparatus allows the boom sections to release and rotate freely upon forceful contact with an immovable object.

Other features will be in part apparent and in part pointed out in the following description.

Description of the Preferred Embodiment

Figure 1:
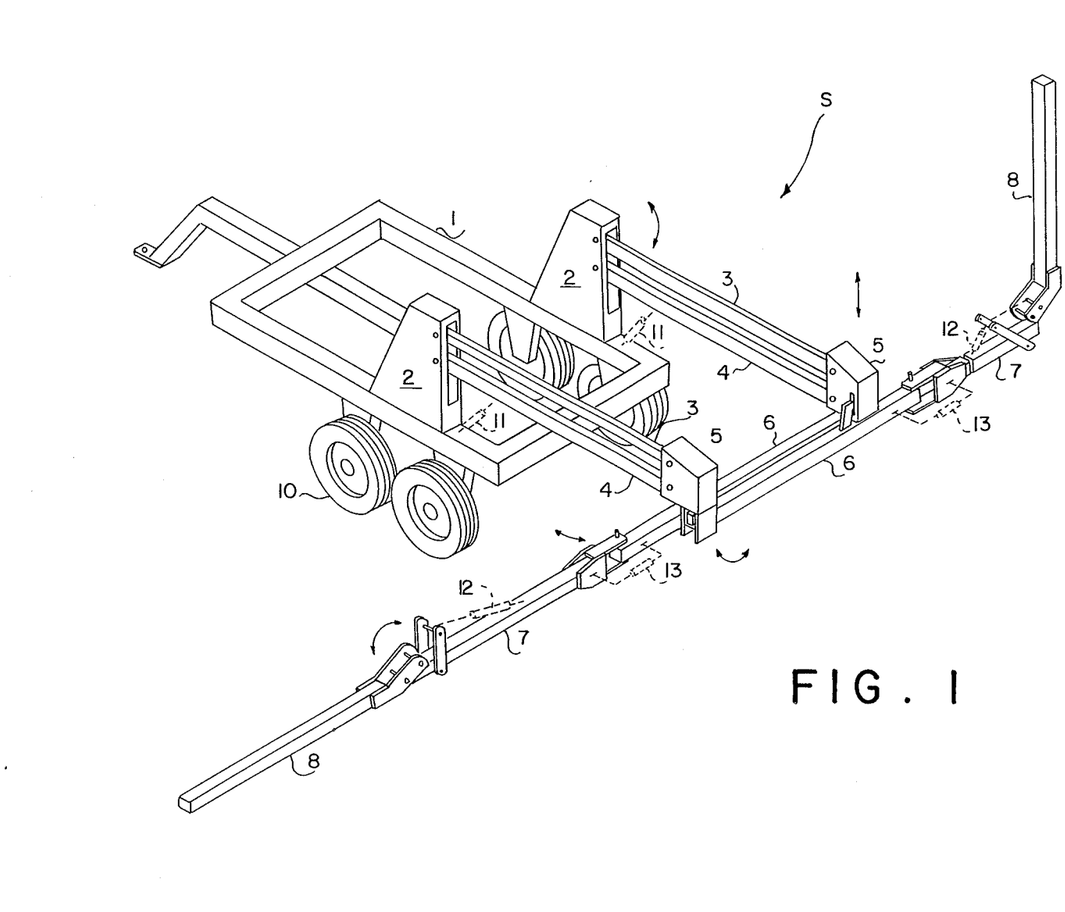
FIG. 1 is a perspective view of a spraying apparatus constructed in accordance with and embodying the present invention.

The new sprayer, generally designated S, is shown in FIG. 1 with the spray boom partially elevated and unfolded in the spray position. The sprayer of the preferred embodiment of the invention comprises a sprayer frame 1 supported on a wheel assembly 10 with a tongue 9 suitable for attaching to a standard truck or tractor drawbar. Alternatively, the sprayer may be self-propelled. Sprayer frame 1 supports a chemical tank, spray pump and hydraulic motor, hydraulic oil reservoir and spray and hydraulic valves. (None of these components are shown.) Boom support posts 2 are rigidly attached at their bases to sprayer frame 1 and support upper boom support arms 3 and lower boom support arms 4 at their tops. Other features illustrated in FIG. 1 will be discussed hereafter.

Figure 2:
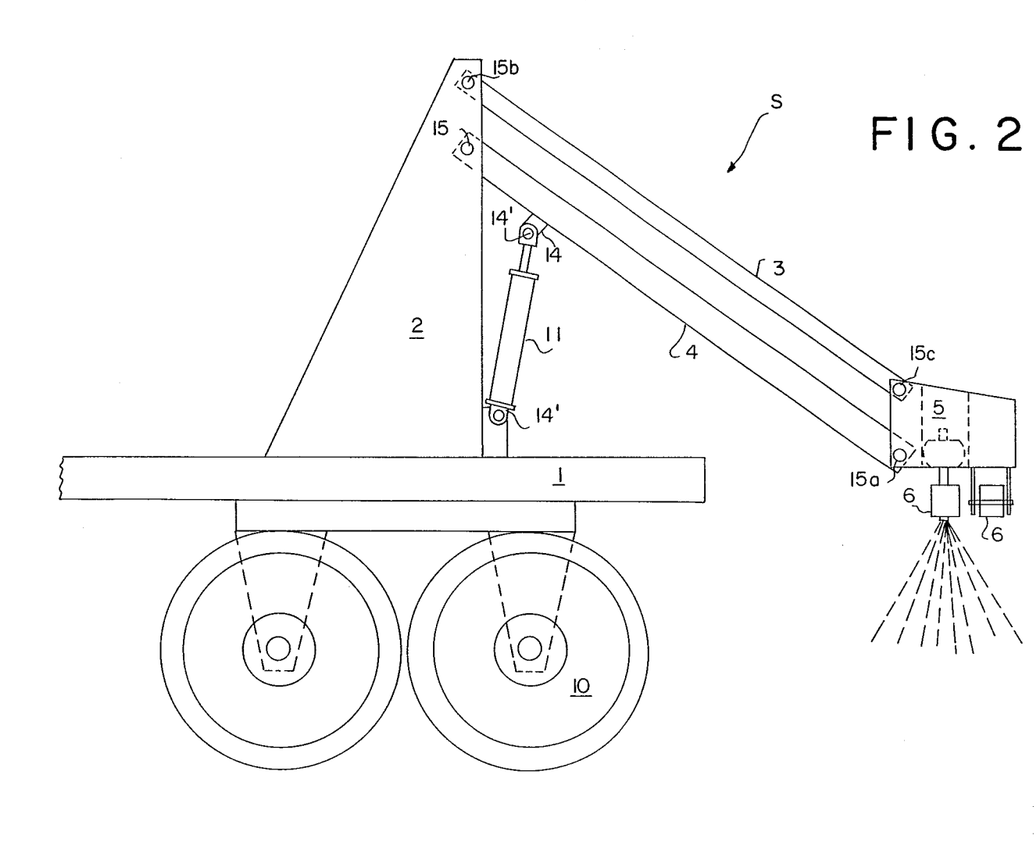
FIG. 2 is an elevation of the invention of FIG. 1, illustrating the upright support means and parallel arms for raising and lowering the lateral spray boom.

FIG. 2, a side view of the boom support post 2 and boom support arms 3 and 4, shows the manner in which hydraulic cylinders 11 preferably are pinned 14' at their base to sprayer frame 1 and at their upper end to support arm 4 for free rotation in a vertical plane. As hydraulic cylinders 11 extend they apply pressure to cylinder bracket 14, causing lower boom arm 4 to rotate in a vertical plane about a pin 15 in boom support post 2. The force exerted on lower boom arm 4 causes boom support bracket 5 to rise vertically, rotating in a vertical plane about a pin 15a. The upper boom support arm 3 is connected by pin 15b to boom support post 2 and to boom support bracket 5, by a pin 15c. As boom support bracket 5 is elevated it is maintained in a constant vertical postion by the parallel linkage of upper boom arm 3 and lower boom arm 4, which thus always move in parallel as they rotate. The lateral spray boom is selectively adjustable, as described above, from a few inches to many feet above the ground.

Figure 3A:
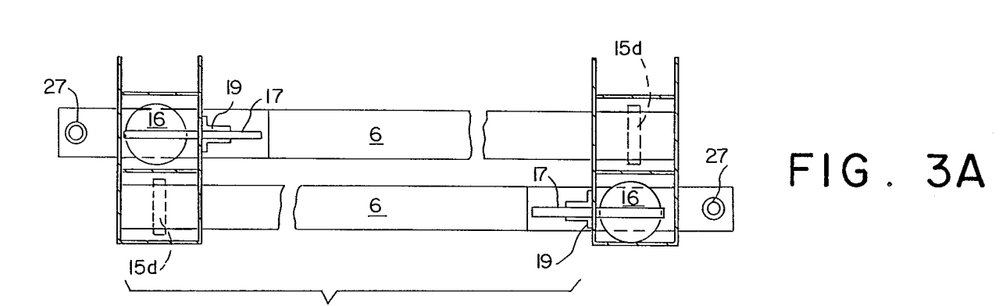
FIGS. 3A, 3B and 3C, respectively, illustrate a plan view, an elevation and a section taken along line 3C—3C of the twin boom support, suspension and pivot assemblies.
Figure 3B:
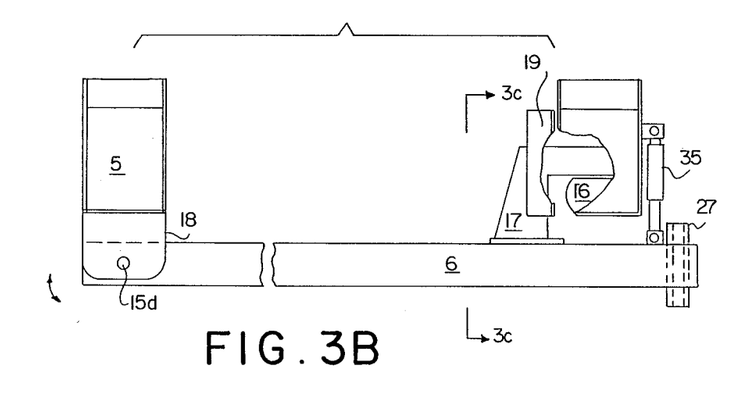
Figure 3C:
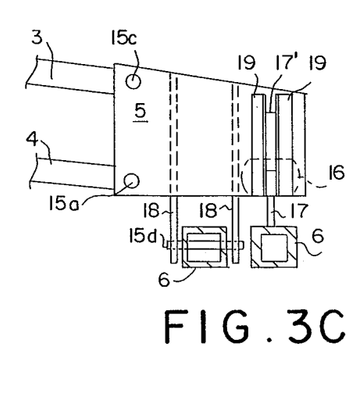

FIGS. 3A, 3B and 3C are three views of the preferred boom suspension system. A boom base section 6 is connected by a horizontal pin 15d to boom support bracket 5. Pin 15d passes through two tabs 18 and through the boom base section 6. This pin connection permits horizontal boom base section 6 to rotate vertically about its pinned end (illustrated by directional arrows in FIG. 3B). Boom support hook 17 is rigidly connected to boom base section 6 and extends upward vertically, then horizontally, through a vertical slot 17' in boom support bracket 5 where it rests upon an air spring 16. Pin 15 restrains boom base section 6 from rotating in a vertical plane perpendicular to boom base section 6. Boom support hook 17 acts to suspend the boom from bracket 5 and is restrained from rotation perpendicular to boom base section 6 by hook restraints 19, mounted on support bracket 5 and shown in FIGS. 3A, 3B and 3C. In FIG. 3B the assembly of hook 17, restraints 19, spring 16, etc. is for simplicity shown only of the right side of the sprayer. The assembly is seen in FIG. 3C from a section taken along line 3C—3C, in view 3B. Slight vertical rotation of a boom base section 6 in a plane parallel to its twin boom base section 6 is thus allowed. Air springs 16 are carried by boom support bracket 5. Shock absorber 35 provides damping action for the air or steel spring 16. Air spring 16 may be replaced by a steel wire spring.

Figure 4A:
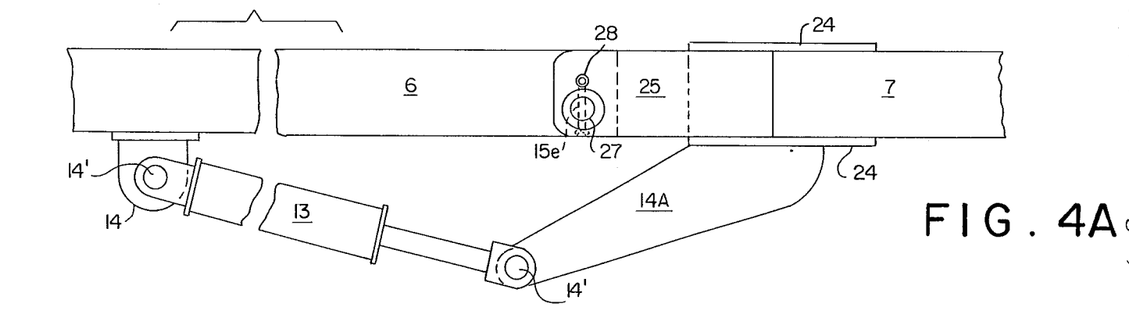
FIGS. 4A and 4B, respectively, illustrate a plan and elevation view of the boom hinge connecting the boom base section to the boom mid-section.
Figure 4B:
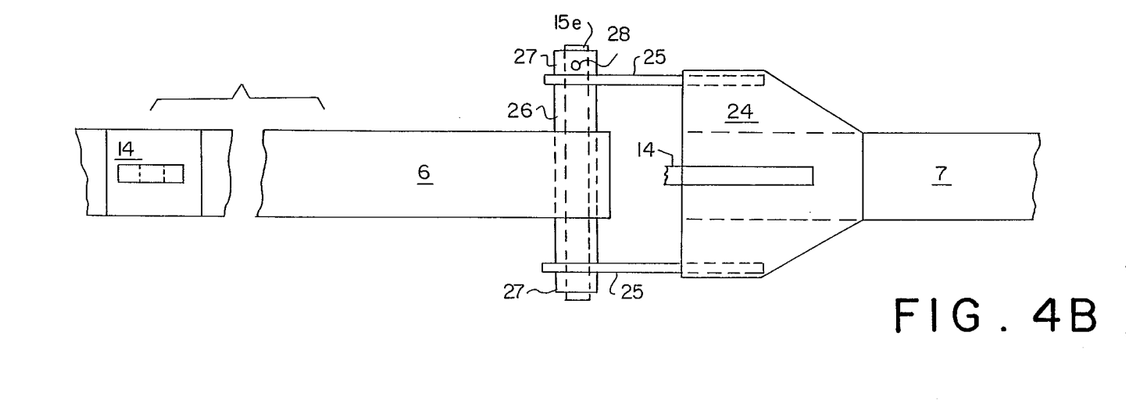

FIG. 1 shows twin lateral spray booms, each boom comprised of a boom base section 6, boom mid-section 7 and boom tip section 8 and extending in opposing directions from boom suppport brackets 5. The support brackets 5 support the lateral booms by their base section 6 from the boom support arms 3 and 4. A pinned connection between boom base section 6 and boom mid-section 7 is also shown in FIGS. 4A and 4B. FIGS. 4A and 4B schematically illustrate that boom mid-section 7 has two vertical brackets 24 rigidly attached, parallel to each other, at its innermost end. The combined vertical brackets 24 serve as a base for two horizontal brackets 25 which have tube 26 support segments 27 rigidly connected top and bottom. Each boom base section 6 is pierced coaxially by tube 26 which is rigidly fastened in place. Boom mid-section 7 is preferably attached to boom base section 6 by installing horizontal brackets 25 over tube 26 and coaxially inserting pin 15e. Pin 15e is kept in place by retainer pin 28. (Similar pins 28 retain other pins 15f, etc.) Hydraulic cylinder 13 is supported by brackets 14 and 14A. As hydraulic cylinder 13 extends, the force which is thereby applied to bracket 14A causes boom mid-section 7 to rotate horizontally about vertical pin 15e to move boom mid-section 7 and boom tip section 8 into a folded position alongside sprayer frame 1 for tranporting. A hydraulic bypass or pressure relief mechanism (not shown), in combination with the geometry of the boom hydraulic connection (FIG. 4A) permits boom mid-section 7 and ultimately boom tip section 8 to rotate horizontally to a position substantially parallel to the direction of trailer travel for transport or when a boom section (7, 8) strikes an immovable object.

Figure 5A:
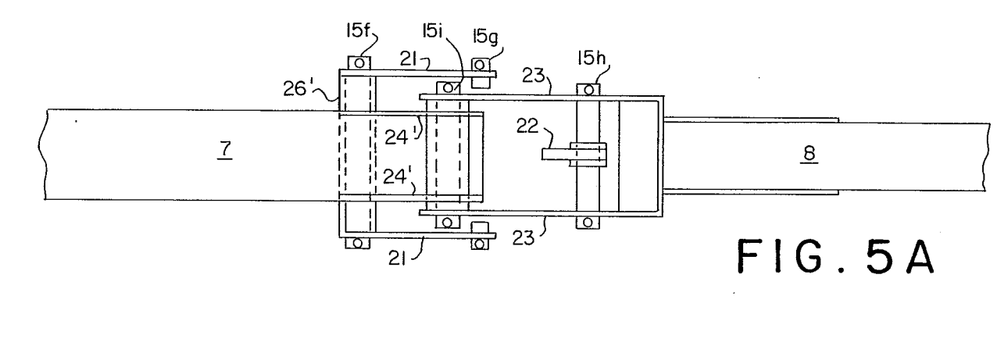
FIGS. 5A and 5B, respectively, illustrate a plan and elevation view of the boom hinge connecting the boom mid-section to the boom tip section.
Figure 5B:
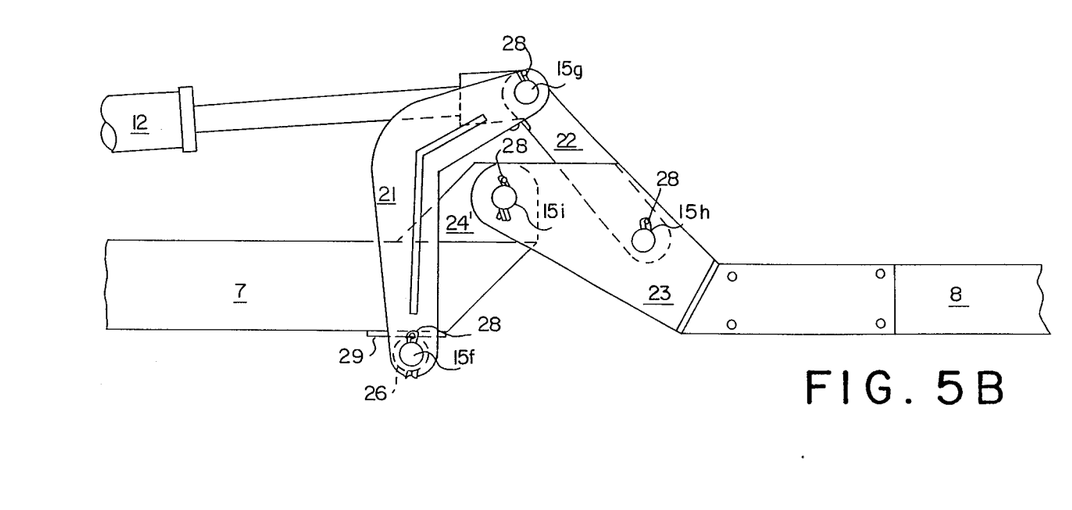

The capability of vertical rotation of boom tip section 8 is illustrated in FIGS. 5A and 5B. Pin bracket 29 (FIG. 5B) is rigidly attached to the bottom of boom mid-section 7 by tube 26, which is firmly attached transverse to boom mid-section 7 as part of pin bracket 29. Rotating links 21 are secured at their base by a pin 15f through pin bracket 29 and are free to rotate in a vertical plane about pin 15f. Hydraulic cylinder 12 is connected by pin 15g which passes through the top of rotating links 21. When hydraulic cylinder 12 is extended the force exerted on pin 15g is transmitted to connection link 22. Link 22 is connected by pin 15h and thereby causes boom tip section bracket 23 to rotate vertically about pin 15i, raising or lowering boom tip section 8. Pin 15i is restrained by tube 26A which is rigidly attached to bracket 24'. Bracket 24' is rigidly attached to the top of the outer end boom mid-section 7. Hydraulic cylinder 12 like cylinder 14 is also equipped with a hydraulic bypass or pressure relief (not shown) to permit free vertical up or down movement when boom tip section 8 strikes an immovable object.

Figures 6A, 6B:
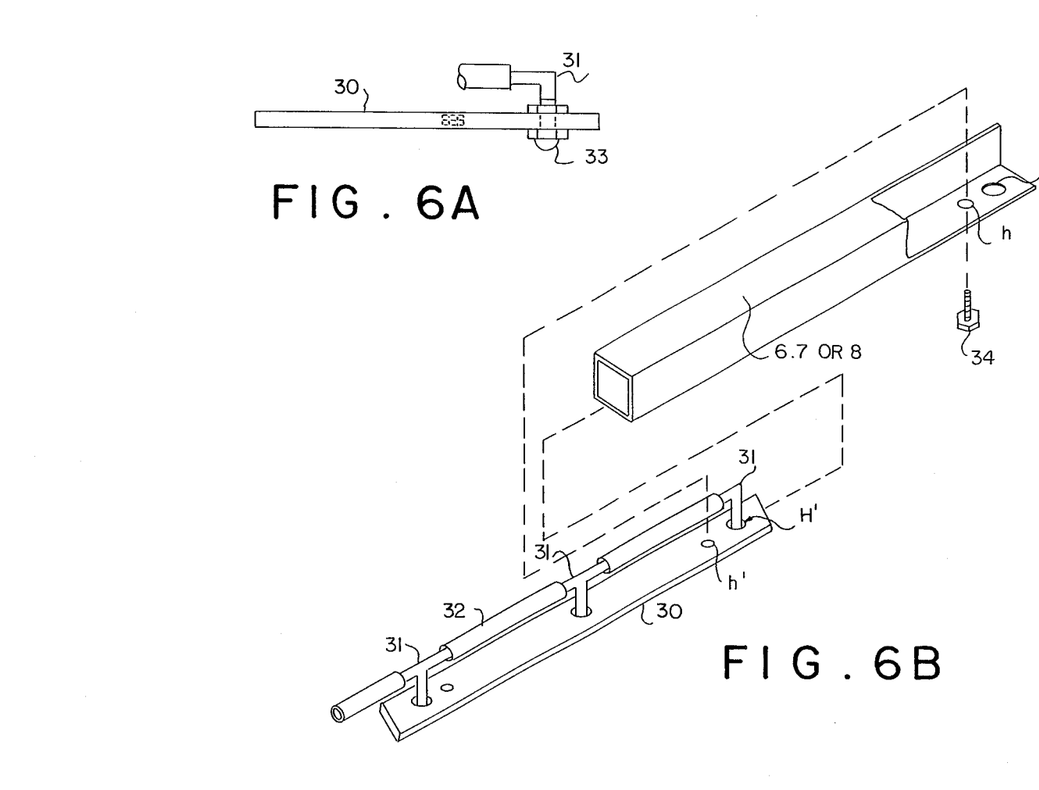
FIGS. 6A and 6B, respectively, illustrate the spray nozzle-tip assembly and spray strip, and an elevation, partly broken away of a tubular boom section and insertable spray hose and strip.

FIGS. 6A and 6B illustrate the preferred installation arrangement of spray nozzles in the boom. Spray strip 30 (FIG. 6B) has drilled holes H' for bulkhead spray fittings 31 and threaded holes h' to receive fasteners 34. Bulkhead spray fittings 31 and spray hose 32 are assembled on spray strip 30. The assembly is then inserted inside boom base section 6, boom mid-section 7 or boom tip section 8. Fasteners 34 are inserted through holes h in the bottom of boom sections 6, 7 or 8 and attached securely to spray strip 30 therein. Bulkhead spray fittings 31 connect sections of spray hose 32 and protrude through holes H in boom base section 6, boom mid-section 7 or boom tip section 8. Spray nozzle tip assemblies, such as that shown at 33, are installed on bulkhead spray fittings 31 and depend beneath the boom. The completed assembly gives a spray boom with hoses 32 and fittings 31 protected inside the boom from damage and provides an uncluttered outside boom surface.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A vehicular apparatus for spraying of liquids, for herbicidal and insecticidal application and the like, comprising a supporting frame for being carried vehicularly, upright support means carried by the frame and trailing boom support means extending rearwardly from the upright support means, means for providing selective pivoting of the trailing boom support means relative to the upright support means for providing vertical adjustability, lateral boom means supported by the trailing boom support means, means for providing selective pivoting of the lateral boom means relative to the trailing boom support means, the lateral boom means including at least inner and outer sections, at least one of the sections including spray nozzle means for selective spraying of liquids, pivotal connection means for connecting and providing pivotal movement of the inner and outer sections relative to each other, the pivotal connection means providing selective boom section positioning as well as approximation by the boom sections of terrain contour to be sprayed.

2. The spraying apparatus according to claim 1 wherein said upright support means comprises two such upright support means, and said trailing boom support means comprises two trailing boom means extending rearwardly, one from each upright support means, each upright support means having means for providing selective pivoting of its respective trailing boom means relative to the respective upright support means synchronously and in parallel with the other trailing boom means.

3. The spraying apparatus according to claim 1, wherein said trailing boom support means comprises a pair of boom support arms located substantially parallel and vertically in relation to each other, said means for providing selective pivoting of the trailing boom support means relative to the upright support means and said means for providing selective pivoting of the lateral boom means relative to the trailing boom support means comprising parallelogram linkages for allowing the spray nozzles located on the lateral boom means to maintain a substantially downward vertical direction as the lateral boom means is raised or lowered.

4. The spraying apparatus according to claim 2, and wherein each trailing boom means each comprises a pair of boom support arms located substantially parallel and vertically in relation to each other, said means for providing selective pivoting of each trailing boom means relative to its respective upright support means and said means for providing selective pivoting of the lateral boom means relative to each trailing boom means comprising parallelogram linkages for allowing the spray nozzles located on the lateral boom means to maintain a substantially downward vertical direction as the lateral boom means is raised or lowered.

5. The spraying apparatus according to claim 1, wherein said lateral boom means comprises a base support section which further comprises pivotal boom end connection means for providing upward and downward vertical pivoting of the lateral boom means relative to the ground and means for providing floating support of the weight of the lateral boom means from the trailing boom support means.

6. The spraying apparatus according to claim 5, wherein said lateral boom means comprises at least two such boom means, the boom means each having base support sections located substantially parallel and horizontally in relation to each other but extending in opposite directions, perpendicular to the line of apparatus travel for optional simultaneous or independent use.

7. The spraying apparatus according to claim 5, wherein said means for providing floating support of the weight of the lateral boom means further comprises spring means and shock absorber means for smoothing operation of said apparatus on rough terrain.

8. The spraying apparatus according to claim 6, wherein said lateral boom means comprises at least one base section, mid-boom section, and boom tip section, and wherein said pivotal connection means provides means for connecting and providing forward and backward horizontal pivotal movement of the boom mid-section relative to the boom base section, said apparatus further comprising further pivotal connection means for connecting and providing vertical pivotal movement of the boom tip section relative to the boom mid-section, the further pivotal connection means also providing selective boom section positioning as well as approximation by the boom sections of terrain contour to be sprayed.

9. The spraying apparatus according to claim 8, wherein said pivotal connection means comprises a connection pin for connecting and providing forward and backward horizontal pivotal movement of the lateral boom mid-section relative to the boom base section, and further comprises means for preventing damage to the spray apparatus by maintaining the lateral boom mid-section in a preselected position while permitting the mid-section to rotate rearwardly relative to other lateral boom base section upon contact of the boom tip or mid-section to rotate rearwardly relative to the lateral boom base section upon contact of the boom tip or mid-section with an immovable object, and further providing means by which an operator may return a boom tip to its original position without stopping the spray apparatus.

10. The spraying apparatus according to claim 9, wherein said means for preventing damage will permit the boom mid-section to rotate at least forty-five degrees rearwardly from the axis of the lateral boom base section subsequent to releasing forward pressure on the mid-section.

11. The spraying apparatus according to claim 8, wherein said further pivotal connection means comprises a connection pin for connecting and providing vertical pivotal movement of the boom tip section relative to the boom mid-section, and further comprising means for preventing damage to the spray apparatus by normally maintaining the lateral boom tip section in a preselected position while permitting the tip section to rotate vertically relative to the boom mid-section upon forceful contact of the boom tip section with an immovable object, and further providing means by which an operator may return a boom tip to its original position without stopping the spray apparatus.

12. The spraying apparatus according to claim 8, wherein the lateral boom mid-sections are short relative to the lateral boom tip sections, for permitting vertical angled spraying with relatively large portions of the entire lateral boom lengths as the contour of terrain to be sprayed requires.

13. The spraying apparatus according to claim 1, and further comprising a drawbar for towing behind a truck or tractor.

14. The spraying apparatus according to claim 1, wherein said lateral boom means comprises a tubular boom having downward facing openings at least along its tip section for passage therethrough of the spray nozzles means, said apparatus further comprising a metal strip with openings corresponding to the openings of the lateral boom, the strip providing means for mounting the spray nozzle means and for positioning the spray nozzle means relative to the lateral boom, and means by which to quickly secure the metal strip or release it from the lateral boom for repair or replacement of the spray nozzle means.

15. A vehicular apparatus for spraying of liquids, for herbicidal and insecticidal application and the like, comprising:
   a supporting frame for being carried vehicularly, two upright support means carried by the frame and two pairs of boom support arms, the arms of each pair located substantially parallel and vertical in relation to each other, the boom support arms extending rearwardly, one pair from each upright support means, parallelogram linkages for providing selective pivoting of each trailing arm pair relative to the upright support means synchronously and in parallel to the other trailing support arm pairs, for providing vertical adjustability;
   tubular lateral boom means supported by the trailing boom support arms, means for providing selective pivoting of the lateral boom means supported by the trailing boom support arms, means for providing selective pivoting of the lateral boom means relative to the trailing boom support means, the lateral boom means including at least one supporting base section, mid-boom section, and boom tip section, at least the tip section including spray nozzle means carried by and mounted within the lateral boom means on a metal strip for selective spraying of liquids, the metal strip and tubular boom having corresponding holes for passage therethrough of the spray nozzle means, means by which to quickly secure or release the metal strip from the lateral boom for repair or replacement of the spray nozzle means;
   pivotal connection means for connecting and providing forward and backward horizontal pivotal movement of the boom mid-section relative to the boom base section, further pivotal connection means for connecting and providing vertical pivotal movement of the boom tip section relative to the boom mid-section, the pivotal connection means and further pivotal connection means each comprising a connection pin for connecting and providing pivotal movement of the outward tubular boom section relative to the inward connected boom section, and means for preventing damage to the spray apparatus by maintaining the outward connected boom section in a preselected position while permitting the same section to rotate freely upon forceful contact with an immovable object;

said lateral boom means base support section further comprising pivotal boom connection means for providing upward and downward vertical pivoting of the lateral boom means relative to the ground and means for providing floating support of the weight of the lateral boom means from the trailing boom support means, the pivotal connection means and further pivotal connection means providing selective boom section positioning as well as approximation by the boom sections of terrain contour to be sprayed.

16. The spraying apparatus according to claim 15, wherein said lateral boom means comprises at least two such means, the base support sections of each located substantially parallel and horizontally in relation to each other, but extending in opposite directions, perpendicular to the line of apparatus travel for optional simultaneous or independent use, said means for providing floating support of the weight of the lateral boom means further comprising spring means and shock absorber means for smoothing operation of said apparatus on rough terrain.

17. The spraying apparatus according to claim 16, wherein the lateral boom mid-sections are short relative to the lateral boom tip sections, for permitting vertical angled spraying with a relatively large portion of the entire lateral boom length as the contour of terrain to be sprayed requires.

18. The spraying apparatus according to claim 15, and further comprising a drawbar for towing behind a truck or tractor.

* * * * *